United States Patent
Grobman (10) Patent No.: US 9,635,557 B2
(45) Date of Patent: Apr. 25, 2017

(54) RELIABILITY FOR LOCATION SERVICES

(75) Inventor: Steven L. Grobman, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 113 days.

(21) Appl. No.: 13/523,819

(22) Filed: Jun. 14, 2012

(65) Prior Publication Data

US 2013/0337827 A1    Dec. 19, 2013

(51) Int. Cl.
*H04Q 7/10* (2006.01)
*H04W 12/12* (2009.01)
*G01S 19/08* (2010.01)
*H04W 4/02* (2009.01)
*H04W 88/02* (2009.01)

(52) U.S. Cl.
CPC .............. *H04W 12/12* (2013.01); *G01S 19/08* (2013.01); *H04W 4/027* (2013.01); *H04W 4/028* (2013.01); *H04W 88/02* (2013.01)

(58) Field of Classification Search
CPC .... H04W 64/00; H04W 4/02; H04L 29/08657
USPC ............ 455/456.1, 456.5, 456.6; 342/357.28
See application file for complete search history.

(56) References Cited

U.S. PATENT DOCUMENTS

| | | | |
|---|---|---|---|
| 6,249,252 B1 * | 6/2001 | Dupray | 342/450 |
| 7,096,029 B1 * | 8/2006 | Parupudi et al. | 455/456.1 |
| 8,099,106 B2 * | 1/2012 | Soliman et al. | 455/456.3 |
| 8,314,736 B2 * | 11/2012 | Moshfeghi | 342/465 |

(Continued)

FOREIGN PATENT DOCUMENTS

| CN | 101303781 A | 11/2008 |
|---|---|---|
| CN | 101449179 A | 6/2009 |

(Continued)

OTHER PUBLICATIONS

International Search Report and Written Opinion received for PCT Application No. PCT/US2013/043863, mailed on Aug. 27, 2013, 13 Pages.

(Continued)

*Primary Examiner* — Ajit Patel
*Assistant Examiner* — Julio Perez
(74) *Attorney, Agent, or Firm* — Grossman, Tucker, Perreault & Pfleger, PLLC (57) ABSTRACT

A system for determining reliability for location resources. A device may be configured to determine device location based on location information received from a location information source, the device including secure systems configured to provide a reliability rating of the location information source. The secure systems may be configured to compare a device location based on the location information to a secondary device location based on secondary information to determine the reliability rating. For example, location information based on location signals received by the device may be compared to sensor information in the device to determine whether the movement described by location information and sensor information agrees. In the same or a different embodiment, a refined reliability rating may be requested from a secure resource in the device or accessible via a network. The secure resource may refine the reliability rating using tertiary information available to the secure resource.

24 Claims, 8 Drawing Sheets

(56) References Cited

U.S. PATENT DOCUMENTS

| | | | |
|---|---|---|---|
| 8,634,853 B2* | 1/2014 | Bogatin | 455/456.1 |
| 2003/0040852 A1 | 2/2003 | Green et al. | |
| 2004/0073364 A1 | 4/2004 | Jung et al. | |
| 2007/0178911 A1* | 8/2007 | Baumeister et al. | 455/456.1 |
| 2008/0137663 A1 | 6/2008 | Gu et al. | |
| 2009/0160711 A1 | 6/2009 | Mehta | |
| 2010/0250727 A1 | 9/2010 | King et al. | |
| 2011/0065457 A1* | 3/2011 | Moeglein | G01S 5/021 455/456.6 |
| 2011/0106450 A1 | 5/2011 | Toda et al. | |
| 2011/0117924 A1 | 5/2011 | Brunner et al. | |
| 2011/0227787 A1* | 9/2011 | Gum et al. | 342/357.28 |
| 2012/0050098 A1* | 3/2012 | Kuehnel et al. | 342/357.31 |
| 2012/0208557 A1* | 8/2012 | Carter | 455/456.1 |
| 2012/0309416 A1* | 12/2012 | Whelan et al. | 455/456.1 |
| 2014/0100781 A1* | 4/2014 | Venkatraman | 701/537 |

FOREIGN PATENT DOCUMENTS

| | | | |
|---|---|---|---|
| CN | 101552966 A | | 10/2009 |
| EP | 2244099 A1 | | 10/2010 |
| JP | 2008-145274 A | | 6/2008 |
| WO | 03067404 A1 | | 8/2003 |

OTHER PUBLICATIONS

Axelrad, P., et al., "Satellite Attitude Determination Based on GPS Signal-to-Noise Ratio", Proceedings of the IEEE, vol. 87, Issue: 1, Jan. 1999, pp. 133-144.

Devlopers, "Location: Android Developers", retrieved on Mar. 19, 2015, 8 pages. Retrieved from: http://developer.android.com/reference/android/location/Location.html.

Johnston, Roger G., et al., "Think GPS Offers High Security? Think Again", Business Contingency Planning Conference, May 23-27, 2004, 24 pages.

International Preliminary Report on Patentability and Written Opinion received for PCT Patent Application No. PCT/US2013/043863, mailed on Dec. 24, 2014, 10 pages.

European Search Report received for European Application No. 13803830.2, mailed on Jan. 14, 2016, 7 pages.

Office Action received for Chinese Application No. 201380025076.3, mailed Feb. 2, 2016, 13 pages of English translation and 11 pages of Chinese Office Action.

Office Action received for Chinese Application No. 201380025076.3, mailed Sep. 29, 2016, 15 pages of English translation and 9 pages of Chinese Office Action.

* cited by examiner

RELIABILITY FOR LOCATION SERVICES

TECHNICAL FIELD

The present disclosure relates to electronic location services, and more particularly, to systems for determining reliability for location information, sources of location information, etc.

BACKGROUND

Electronic communication is becoming increasingly necessary for everyday interactions. Beyond simple voice communication and text messaging, new functionality employing wireless data communication is starting to emerge, converting mobile devices into powerful productivity machines. For example, Internet browsers may provide access to online content. Social media may allow people to interact by sharing content including, for example, blogs, opinions, media (e.g., music, photographs and videos), etc. Business applications may provide essential services such as, for example, collaboration (e.g., videoconferencing), scheduling, contact management, etc. In a more private sphere, mobile devices may provide access to personal information such as, for example, account access for banking transactions, navigation applications that provide location determination, mapping, route planning, user/vehicle/device location services, etc.

Along with the benefits of enhanced functionality comes an unavoidable risk of increased exposure. For example, the ability to access personal information utilizing mobile devices opens up avenues for others to utilize similar routes to access this information with the intent to steal, defraud, etc. For example, bank account numbers, credit card numbers, etc. may be stolen and used for unauthorized purchases. In an effort to provide desired functionality with some level of security, safeguards may be put in place based on other functionality in the device. For example, transactions made from a mobile device may be time-stamped, location-stamped, etc. to help to ensure that the authorized account owner is making the transaction, to determine the location of someone making unauthorized transactions, etc. However, the ability to "spoof" or fool existing systems in mobile devices is increasing along with the functionality. For example, a transmitter may be employed that emulates signals broadcast from a recognized location information source such as, for example, the Global Positioning System (or GPS). These transmitters may provide signals that cause positioning software to resolve that the mobile device is in a different location, and thus, may defeat location-based safeguards in the device, may inhibit determining the actual location of the device for tracking the device/user/vehicle in cases of theft, kidnapping, national security, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for determining reliability for location services. Initially, various forms of the terms "position" and "location" may be utilized interchangeably in the following disclosure in general reference to resources for approximating the location of a device. In this regard, location services may encompass any form of electronic location or position determination system wherein location information may be received from at least one location information source outside of a device, the location information being usable to approximate the location of the device. For example, the Global Positioning System (GPS) is a well known example of a system wherein location information sources (e.g., satellites) provide location information (e.g., GPS signals) that may be used for approximating the location of the device. However, as will be discussed, location services are not limited to positioning only via GPS. Moreover, the term remote, as referenced herein, may refer to any resource located outside of a device. For example, the device may be a member of a wired or wireless network, and any other device also in the network (e.g., mobile devices, servers, etc.) may be considered "remote" to the subject device. The term secure, as referenced herein, refers to any system configured to not provide equal access and/or control privileges to all entities that attempt to access the system. For example, a system may be deemed secure if certain entities can make requests of the system, but are barred from accessing or altering the configuration, operation or makeup of the system.

In one embodiment, a device may include location services configured to receive location information and to approximate the location of the device based on the location information. In addition, the device may also include a secure system such as, for example, a secure operating core (SOC), configured to provide a reliability rating of the source of the location information utilized by the location services and how this information was obtained. These features may be utilized in combination to provide device location approximation at various confidence levels. For example, if the current location of the device is desired without any reliability rating, a host in the device (e.g., a system configured to control general device operations) may submit a request for device location directly to the location services. The location services may then provide an approximate location directly to the host based on received location information.

However, there may be instances when the determination of the reliability of a location information source may be beneficial or even essential (e.g., when attempting to determine the legitimacy of purchases or other financial transactions, when tracking devices/users/vehicles in cases of theft, kidnapping, national security etc.). In such instances the host or a remote entity (e.g., coupled to device via wired or wireless communication) may request a reliability rating. The request may be submitted to the SOC. The SOC may be configured to initially request at least location information from the location services in the device, and to approximate a device location based on the location information. The SOC may be further configured to then obtain secondary location information, to approximate a secondary device location based on the secondary location information, and to determine the reliability rating by comparing the original and secondary device locations (e.g., the closer the correspondence between device locations, the higher the reliability rating for the location information source). Secondary location information may include any information usable for approximating a device location that was not utilized in determining the original device location. Examples of secondary location information include, but are not limited to, cellular or network membership, networks that are sensed in proximity to the device, device sensor information (e.g., device orientation, motion, acceleration, etc.).

GPS may be the primary source of location information in many devices. However, a GPS signal source may be fabricated or spoofed through a GPS replicator capable of generating signals that are recognized by devices as coming from GPS satellites. A GPS replicator may be employed to falsify device location. In one embodiment, a device location generated based on GPS information may be verified (e.g., a reliability rating may be determined) based on sensor information in the device. For example, sensors in the device may be configured to sense device orientation, motion, acceleration, etc. while GPS signals are being received by the device. The change in device location determined based on GPS may be compared to the change in device location sensed by the sensors in order to determine a reliability rating for the GPS source. The GPS replicator cannot anticipate the motion of the device, and thus, device location determined based on GPS signals received from the GPS replicator should not correspond to the orientation, motion or acceleration of the device sensed by the sensors, and thus, the reliability rating of the GPS replicator will be low, indicating to the requesting entity that falsification may be occurring.

In the same or a different embodiment, a refined reliability rating may also be requested. For example, reliability ratings may be limited by the ability of the SOC to establish an accurate secondary device location due to, for example, limited availability of high resolution secondary location information in the device. In such instances it may be possible for the SOC to initiate a refined reliability rating. For example, upon receiving a request for a refined reliability rating, the SOC may be configured to transmit a secure information package to a secure resource. The secure resource may be configured to, for example, evaluate trustworthiness for the environment in which the device is operating and to perform further location information source testing based on, for example, more accurate location information. While the secure resource may reside on the device along with the SOC, in one embodiment the secure resource may be situated remotely from the device and accessible via a network (e.g., the Internet). The secure resource may refine the reliability rating by, for example, determining a tertiary device location based on the more accurate location information available to the secure resource, and may compare the original and/or the secondary device location to the tertiary device location. Based on the comparison, the secure resource may determine a refined reliability rating and provide the rating to the SOC.

Figure 1:
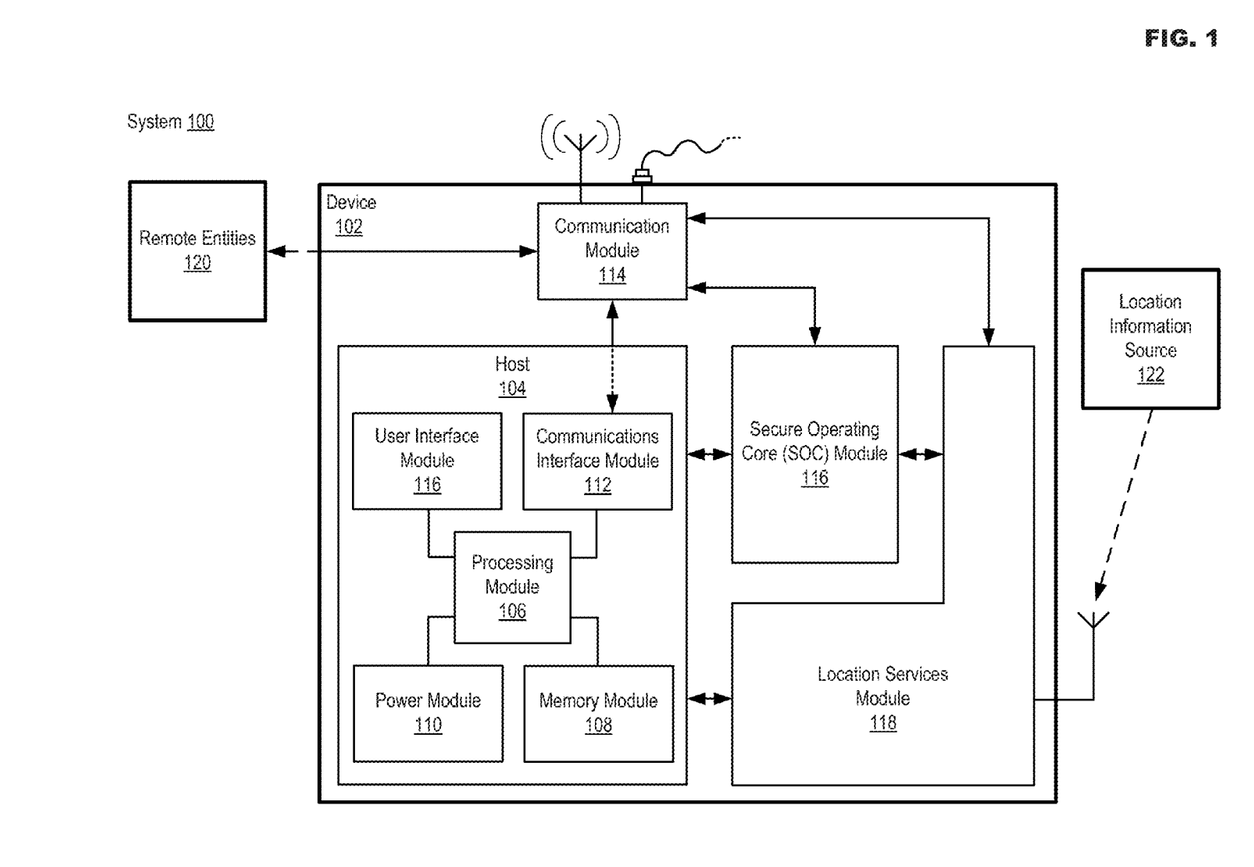
FIG. 1 illustrates an example system configured to determine reliability for location services in accordance with at least one embodiment of the present disclosure.

FIG. 1 illustrates example system 100 configured for to determine reliability for location services in accordance with at least one embodiment of the present disclosure. System 100 may comprise, for example, device 102, remote entities 120 and location information source 122. Examples of device 102 may include, but are not limited to, a mobile communication device such as cellular handset or a smartphone based on the Android® operating system (OS), iOS®, Blackberry® OS, Palm® OS, Symbian® OS, etc., a mobile computing device such as a tablet computer like an iPad®, Galaxy Tab®, Kindle Fire®, etc., an Ultrabook® including a low-power chipset manufactured by Intel Corp., a netbook, a notebook computer, a laptop computer, etc., a typically stationary computing device such as a desktop computer, etc. Remote entities 120 may include devices, resources, requestors, etc. that interact with device 102 via, for example, a wide area network (WAN) like the Internet or a local area network (LAN) established using wired or wireless communication. Examples of devices and/or resources may include any of the devices mentioned above with respect to device 102 and may further include typical network-accessible devices like web servers, etc. Examples of location information source 122 may include any system capable of providing location information from which device 102 may approximate its own position such as, for example, a satellite-based system like GPS including a plurality of satellites configured to provide signals usable in determining device location, or a terrestrial-based positioning system such as a cellular network including a plurality of cellular towers.

Device 102 may comprise, for example, host 104, communication module 114, secure operating core (SOC) module 116 and location services module 118. Initially, host 104 may be configured to perform various functions that may occur during normal operation of device 102. For example, processing module 106 may comprise one or more processors situated in separate components, or alternatively, may comprise one or more processing cores embodied in a single component (e.g., in a System-on-a-Chip (SOC) configuration). Example processors may include various x86-based microprocessors available from the Intel Corporation including those in the Pentium, Xeon, Itanium, Celeron, Atom, Core i-series product families. Processing module 106 may be configured to execute instructions in device 102. Instructions may include program code configured to cause processing module 106 to perform activities related to reading data, writing data, processing data, formulating data, converting data, transforming data, etc. Information (e.g., instructions, data, etc.) may be stored in memory module 108. Memory module 108 may comprise random access memory (RAM) or read-only memory (ROM) in a fixed or removable format. RAM may include memory configured to hold information during the operation of device 102 such as, for example, static RAM (SRAM) or Dynamic RAM (DRAM). ROM may include memories such as bios memory configured to provide instructions when device 102 activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc. Power module 110 may include internal power sources (e.g., a battery) and/or external power sources (e.g., electromechanical or solar generator, power grid, etc.), and related circuitry configured to supply device 102 with the power needed to operate.

Communications interface module 112 may be configured to handle packet routing and other control functions for communication module 114, which may include resources configured to support wired and/or wireless communications. Wired communications may include parallel and serial wired mediums such as, for example, Ethernet, Universal Serial Bus (USB), Firewire, etc. Wireless communications may include, for example, close-proximity wireless mediums (e.g., radio frequency (RF), infrared (IR), optical character recognition (OCR), magnetic readers, etc.), short-range wireless mediums (e.g., Bluetooth, wireless local area networking (WLAN), Wi-Fi, etc.) and long range wireless mediums (e.g., cellular, satellite, etc.). In one embodiment, communications interface module 112 may be configured to prevent wireless communications that are active in communication module 114 from interfering with each other. In performing this function, communications interface module 112 may schedule activities for communication module 114 based on, for example, the relative priority of messages awaiting transmission. User interface module 116 may include circuitry configured to allow a user to interact with device 102 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.).

Host 102 may be configured to interact with SOC module 116. SOC module 116 may include processing resources that are secure from the remainder of device 102. For example, in x86 architecture some software-based attacks change or corrupt aspects of the operating system (OS) of a device, and through this corruption access may be gained to subservient applications. Thus, the OS may be able to corrupt or otherwise access aspects of applications since the OS runs in supervisory (e.g., kernel) mode while applications run in user mode. SOC module 116 may provide a space in which applications may execute independently of influence from the OS. As a result, the OS may have limited interaction with SOC module 116 in that, for example, the OS may make requests of the SOC module 116, but may not control or make substantial changes to SOC module 116. Location Services module 118 may provide positioning functionality for device 102. For example, locations services module 118 may comprise one or more receivers configured to receive location information from location information source 122. One example of a receiver usable in this regard is a GPS receiver. Location services module 118 may further comprise, or may at least have access to, other resources in device 102 usable for approximating device location, such as, for example, communication module 116 (e.g., for determining location using wireless network membership or via sensing proximate wireless devices and/or networks), as well as various sensors configured to sense device orientation, motion, acceleration, etc.

Figure 2:
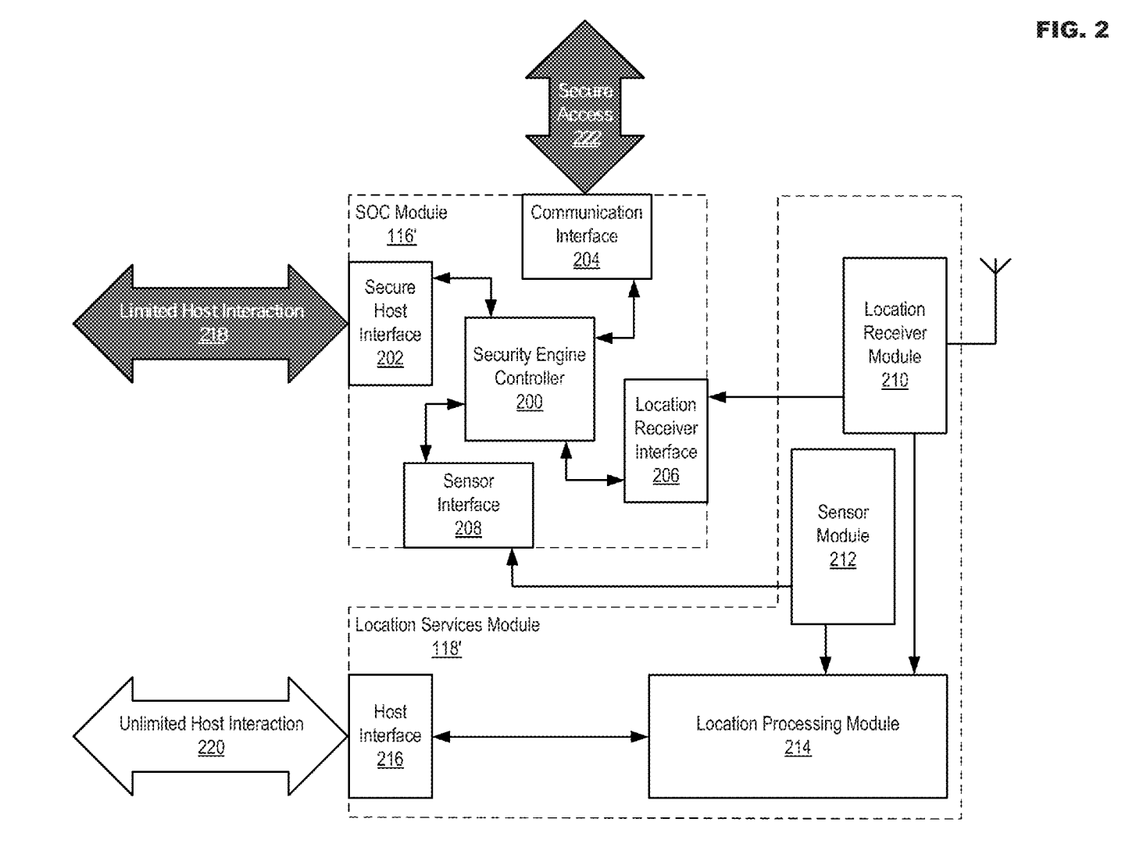
FIG. 2 illustrates example configurations for secure operating core module and a location services module usable with at least one embodiment of the present disclosure.

FIG. 2 illustrates example configurations for secure operating core module 116' and location services module 118' usable with at least one embodiment of the present disclosure. SOC module 116' may include at least security engine controller 200 and one or more interfaces corresponding to the modules of device 102 with which SOC module 116' may interact. These interfaces may include, for example, secure host interface 202, communication interface 204, location receiver interface 206 and sensor interface 208. While only four interfaces have been illustrated in FIG. 2, it is possible for SOC module 116' to include fewer or additional interfaces corresponding to the number of modules in device 102 with which SOC module 116' interacts. It may also be possible for interfaces to be configured to interact with more than one feature, and thus, any of interfaces 202 to 208 may be combined in accordance with various embodiments.

Location services module 118' may comprise, for example, location receiver module 210, sensor module 212, location processor module 214 and host interface 216. Location receiver module 210 may be configured to receive location information from location information source 122. For example, location receiver module 210 may be a GPS receiver. Sensor module 212 may include, or may provide access to, sensors in device 102 configured to sense, for example, device orientation, motion or acceleration. In some instances the sensors may be able to provide multiple types of information. For example, accelerometers may be able to measure acceleration for the device with respect to the earth's gravitational field vector, and based on this information may also provide information such as, for example, device orientation in the form of pitch and roll orientation angles, yaw, tilt, etc. Device orientation may be based on, for example, a fixed coordinate system (e.g., magnetic compass headings) or a relative coordinate system (e.g., the current orientation of the device with respect to a previously detected orientation, another device, etc.). Location information from location receiver module 210 and/or sensor module 212 may then be provided to location processing module 214 for approximating device location, which may be provided directly to host 104, upon request, via host interface 216.

Host 104 may have unlimited interaction with location services module 118' as shown as 220. In response to requests for location information, location services module 118' may obtain location information from at least location receiver module 210, approximate a device location based on the location information in location processing module 214, and provide the location information to host 104 via host interface 216. Moreover, host 104 may be able to configure operation for at least some aspects of location services module 118'. On the contrary, security engine controller 200 may provide an environment for processing applications that is immune to any influence from host 104. At least one application processed by security engine controller 200 may be configured to determine reliability ratings for location information sources. In instances when host 104 desires to obtain a reliability rating for the location information source, host 104 may request at least the reliability rating from SOC module 116' as shown at 218. The interaction shown at 218 may be considered "limited" in that host 104 may request the reliability rating, but has no influence over the behavior of the reliability rating application being executed by security engine controller 200. In determining a device location and reliability rating, security engine controller 200 may request location information directly from location receiver module 210 via location receiver interface 206, and may request secondary location information from at least one of sensor module 212 via sensor interface 208, or from communication module 114 via communication interface 204 (e.g., through secure access 222). In this manner security engine controller 200 may obtain the information needed to determine the device location and reliability rating independent of any influence from the host. Security engine controller 200 may then, in one embodiment, approximate a device location based on the location information received from location received module 210, may approximate a secondary device location based on the secondary location information received from sensor module 212 and/or communication module 114, may compare the device location to the secondary device location, and may determine a reliability rating depending on the correspondence between the two locations. The reliability rating may then be provided to host 104 via secure host interface 202 (e.g., as shown at 218).

Figure 3:
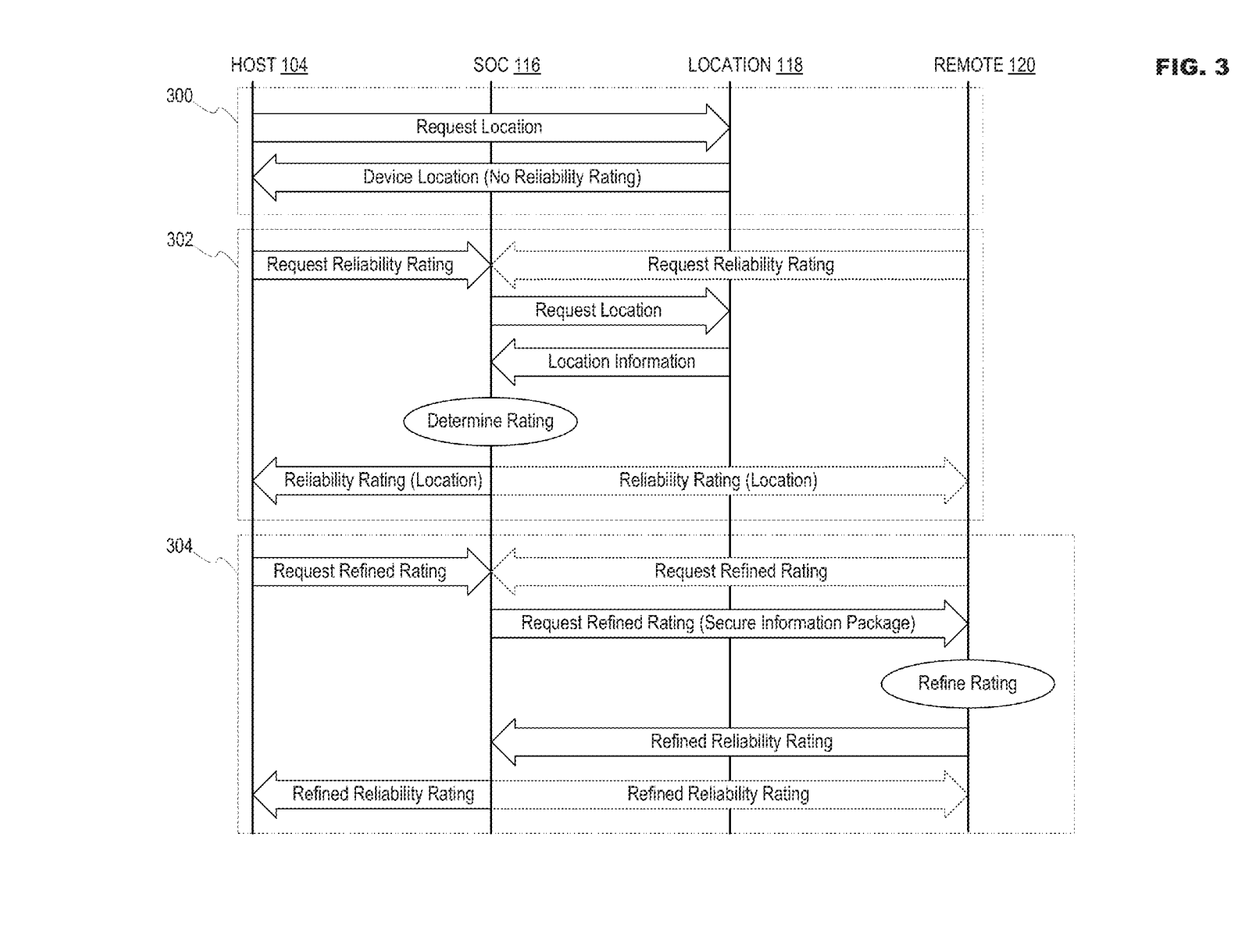
FIG. 3 illustrates example interactions for reliability determination including remote actors in accordance with at least one embodiment of the present disclosure.

FIG. 3 illustrates example interactions for reliability determination including remote actors in accordance with at least one embodiment of the present disclosure. More specifically, FIG. 3 incorporates remote actors to demonstrate how device 102 may interact with external resources when providing device location and/or reliability ratings. The example interactions illustrated at 300 demonstrate a request for device location without a reliability rating. Host 104 may simply request the device location directly from location services module 118, to which location services module 118 may respond with a device location. In the example interactions illustrated at 302, a request for a reliability rating may be initiated by host 104 and/or remote entities 120. For example, in financial transactions the identity of the requestor (e.g., person transferring money, charging merchandise, etc.) may be established by determining the location of the device when making the request. A person making a charge in one location and then immediately attempting another purchase hundreds of miles away from the initial location would indicate that one of the transactions is fraudulent. However, spoofing location services module 118 using a false signal (e.g., from a GPS replicator) could easily defeat this safeguard. Thus, in one embodiment remote entities 120 may include a financial entity that may initiate a request for a reliability rating from device 102 (e.g., in a direct interaction with SOC module 116 via communication module 114, via an application executing in host 104, etc.) in order to establish some level of assurance that device 102 is where it purports to be. After a reliability rating is requested, SOC module 116 may request location information from at least location services module 118, may receive the location information and may determine the reliability rating (e.g., by approximating a device location, approximating a secondary device location and comparing the original and secondary device locations). The reliability rating, and possibly the device location, may then be provided to the requestor (e.g., host 104 or remote entities 120).

In some instances the reliability may not be acceptable to the requestor. For example, the reliability rating may be based on secondary location information with limited accuracy (e.g., the reliability rating was determined based on network triangulation using trusted servers that only allowed device 102 to verify that device 102 was within ten miles of the device location), which caused the reliability rating to be lower than an acceptable level. As shown at 304, either host 104 or a remote resource 120 may then request a refined reliability rating via SOC module 116. Upon receiving a request for a refined reliability rating, SOC module 116 may send a request to a secure resource, which in the example of FIG. 3 is another remote resource 120. In this instance, remote entities 120 may comprise a secure resource including, for example, at least one server configured to determine refined reliability ratings. In at least one embodiment, the request may include a secure information package containing, for example, device identification information, the device location, the secondary device location and any other information that may be used by the secure server in refining the reliability rating. For example, the secure server may be able to access network triangulation resources that are much more accurate than the servers available to device 102. The secure server may then approximate a tertiary device location based on tertiary location information, may compare the tertiary device location to at least one of the original device location or the secondary device location, and may refine the reliability rating based on this comparison. The refined reliability rating may be provided to SOC module 116, which may provide the refined reliability rating to the requestor (e.g., host 104 and/or remote entities 120).

Figure 4:
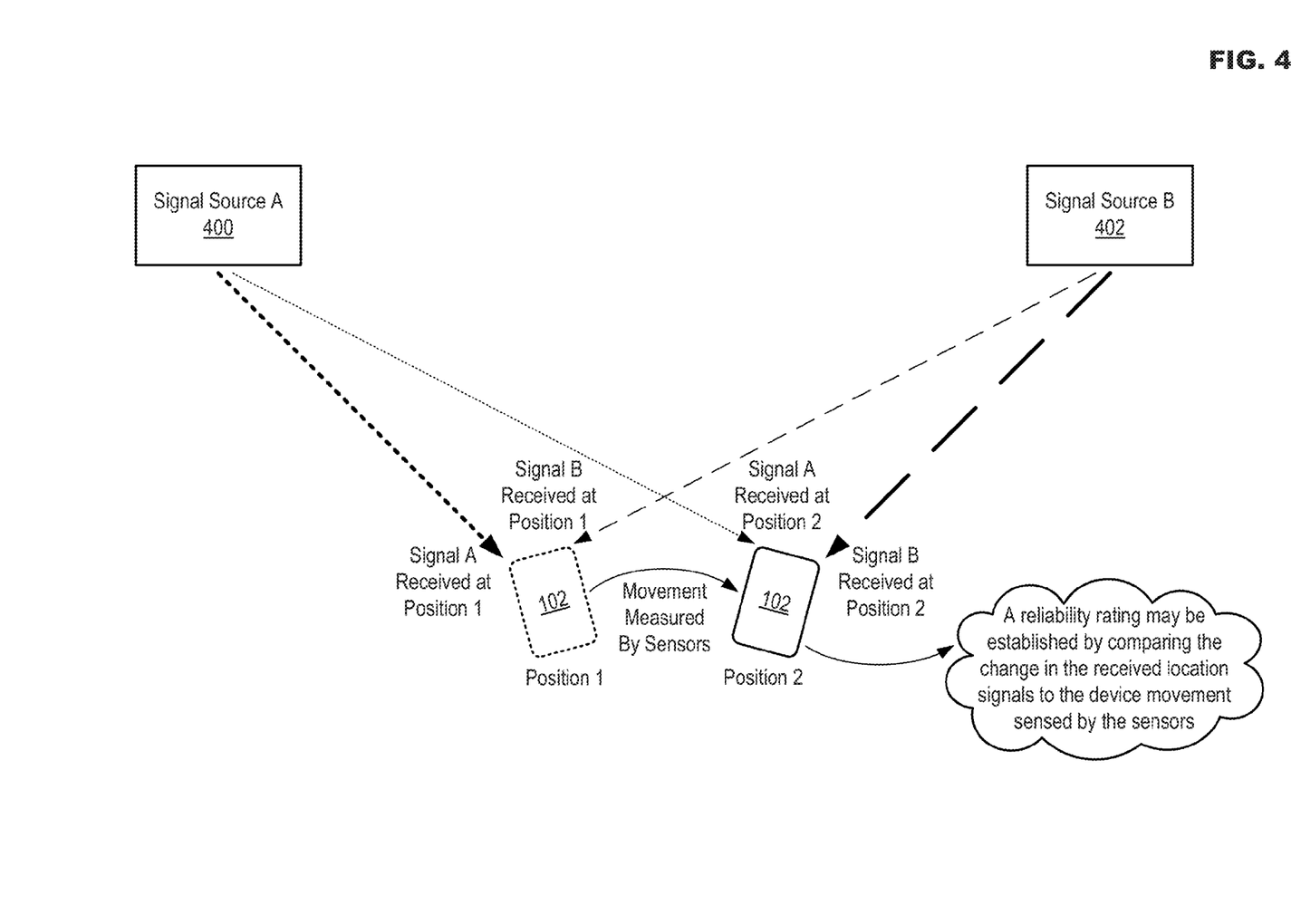
FIG. 4 illustrates an example reliability rating determination based on comparing Global Positioning System (GPS) information to sensor information in accordance with at least one embodiment of the present invention.

FIG. 4 illustrates an example reliability rating determination based on comparing GPS location information to sensor location information in accordance with at least one embodiment of the present invention. It is important to note that GPS has been utilized in this example only for the purpose of explanation, and thus, embodiments are also possible using other positioning systems based on similar operational principles. In a GPS system, a device may receive signals from multiple satellites, and may use information in the signal, the timing of the signal arrival, etc. to approximate the location of the device. While only two signal sources have been shown in FIG. 4 (e.g., signal source A 400 and signal source B 402) the system described in FIG. 4 may operate with any number of signal sources, and may be more accurate with additional sources.

In FIG. 4 device 102 is illustrated as moving from position 1 to position 2. At position 1 a first signal may be received in device 102 from signal source A 400 ("Signal A") and a second signal may be received in device 102 from signal source B 402 ("Signal B"), wherein signal A is depicted as being stronger (e.g., having a higher signal-to-noise ratio (SNR)) than signal B since, for example, signal source A 400 is closer to position 1 than signal source B 402. As device 102 is moved from position 1 to position 2, sensors in device 102 may sense the movement. Sensing the movement may vary depending on the type of sensor employed. For example, an orientation sensor like an electronic compass may sense the movement in terms of degrees, while motion or acceleration sensors may sense the movement as a distance, speed, acceleration, etc. Regardless of the information actually sensed, it may be translated into a change of location for device 102.

Figure 5:
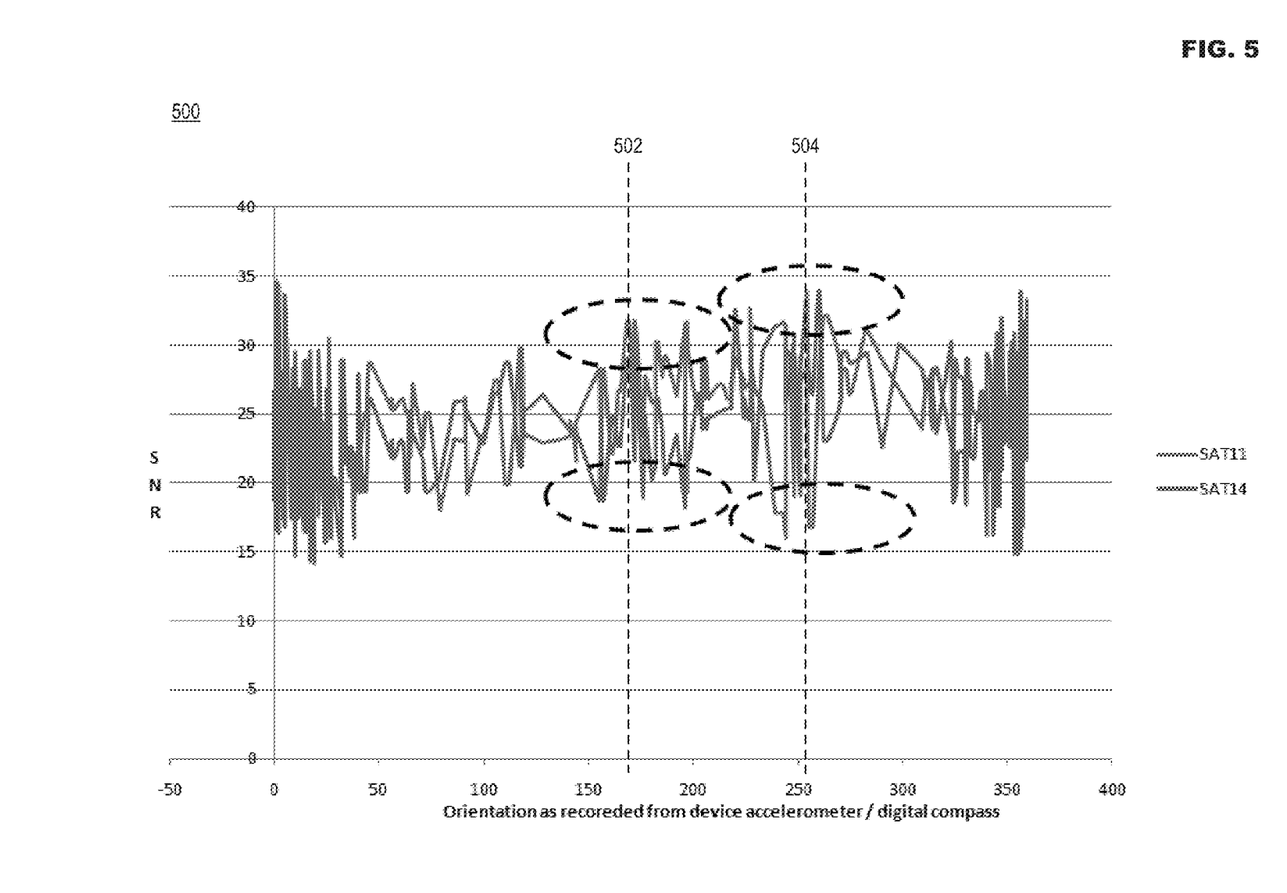
FIG. 5 illustrates an example relationship comparing signal-to-noise ratios (SNR) for Global Positioning System (GPS) signals to sensed apparatus orientation in accordance with at least one embodiment of the present invention.

At position 2 signal B (the signal received from signal source B 402) may be stronger than signal A (the signal received from signal source A 400), which is expected if device 102 actually moves from position 1 to position 2. A reliability rating may then be established by comparing the change in the received location signals to device movement as sensed by the sensors. An example chart comparing the SNR for GPS signals received in a device from two satellites as compared to the orientation of the device as measured by an accelerometer/digital compass is disclosed at 500 in FIG. 5. At point 502 the SNR of the signal received from satellite 11 (SAT 11) is higher that the SNR of the signal received from satellite 14 (SAT 14). However, as the device is rotated the intensity of these signals change so that, after the device is rotated almost one hundred degrees to point 504, the SNR of the signal received from SAT 14 is now higher than the signal received from SAT 11. This type of relationship may be employed in determining whether the location signals being received at device 102 are legitimate. A GPS replicator is predicated on the idea that positioning in the device relies solely on the replicated signals, and thus, the GPS replicator in not equipped to anticipate how to change the replicated signals appropriately when the device is moving. Thus, the lack of a signal/sensor relationship such as demonstrated in FIG. 5 may indicate that the current location signal source is unreliable.

Figure 6:
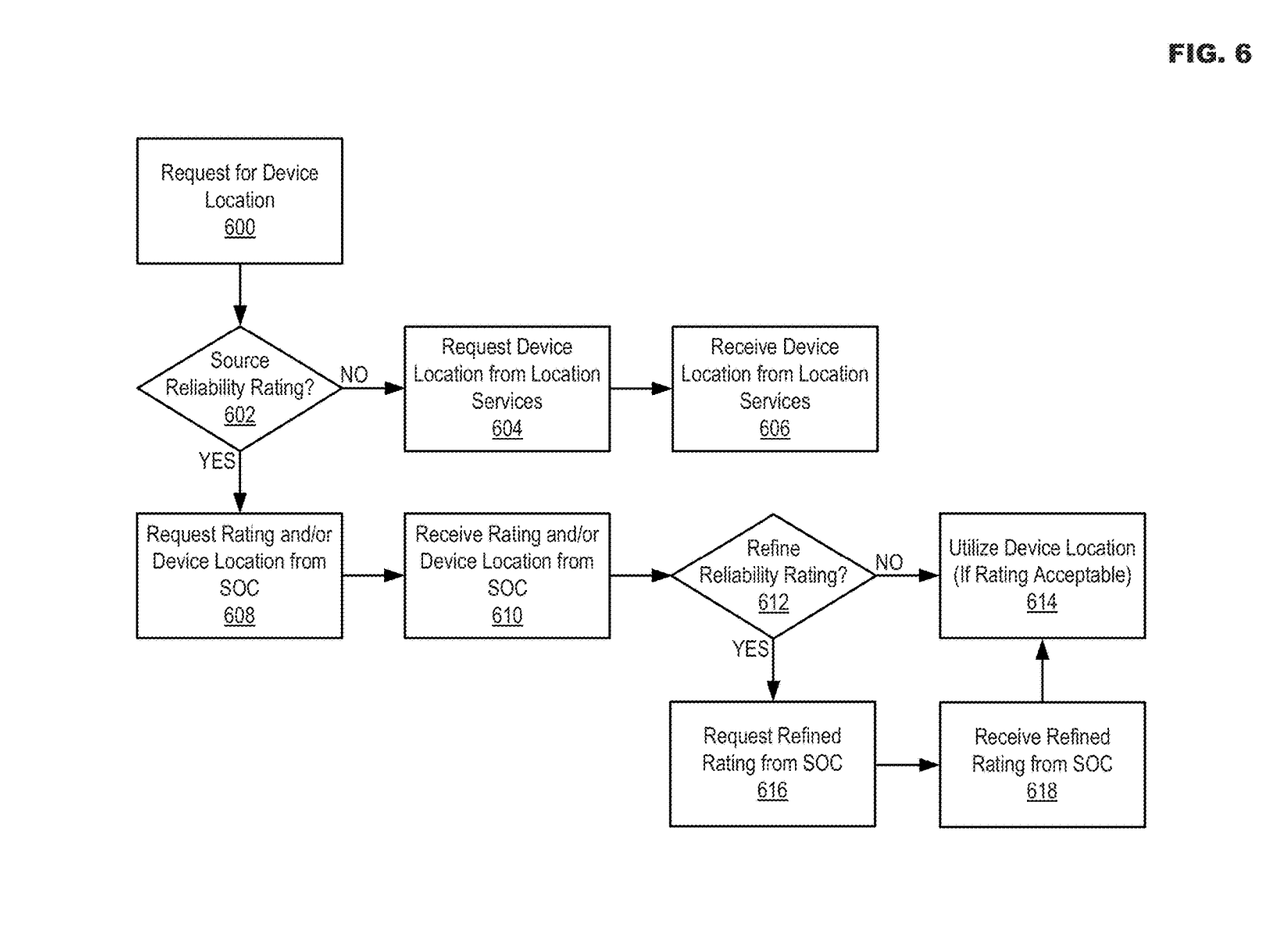
FIG. 6 illustrates a flowchart of example operations for reliability determination from the host perspective in accordance with at least one embodiment of the present disclosure.

FIG. 6 illustrates a flowchart of example operations for reliability determination from the host perspective in accordance with at least one embodiment of the present disclosure. Initially, a device location may be requested in operation 600. The request for device location may be initiated by, for example, an application executing in the host, a remote entity (e.g., a financial institution, a security organization, etc.). A determination may then be made in operation 602 as to whether a reliability rating for the location information source has been requested along with the device location. If it is determined in operation 602 that no reliability rating was requested, then in operation 604 the device location may be requested directly from the location services module in the device, and in operation 606 a device location may be received from the location services module.

If in operation 602 it is determined that both a device location and reliability rating was requested, then in operation 608 a reliability rating and/or device location may be sent to an SOC module in the device. In one embodiment, it may be possible for the location services module to provide the device location while the SOC module only provides the reliability rating. However, in the embodiment shown in FIG. 6 the reliability rating and/or device location may be received from the SOC module. In operation 612, a determination may be made as to whether a refined reliability rating is required. A refined reliability rating may be required if the reliability rating received from the SOC module is too low because of, for example, the accuracy of secondary location information available to the device being limited. If in operation 602 it is determined that a refined reliability rating is not required, then in operation 614 the device location may be utilized (if the reliability rating is acceptable). For example, a very low reliability rating received from the SOC module may indicate that the location information source is questionable, and thus, the device location may be discarded. If in operation 612 it is determined that a refined reliability rating is desired, then in operation 616 a request for a refined reliability rating may be sent to the SOC module in the device. The refined reliability may then be received from the SOC module in operation 618, which may then be followed by a return to operation 614 wherein the device location may be utilized if, in this case, the refined reliability rating is deemed acceptable.

Figure 7:
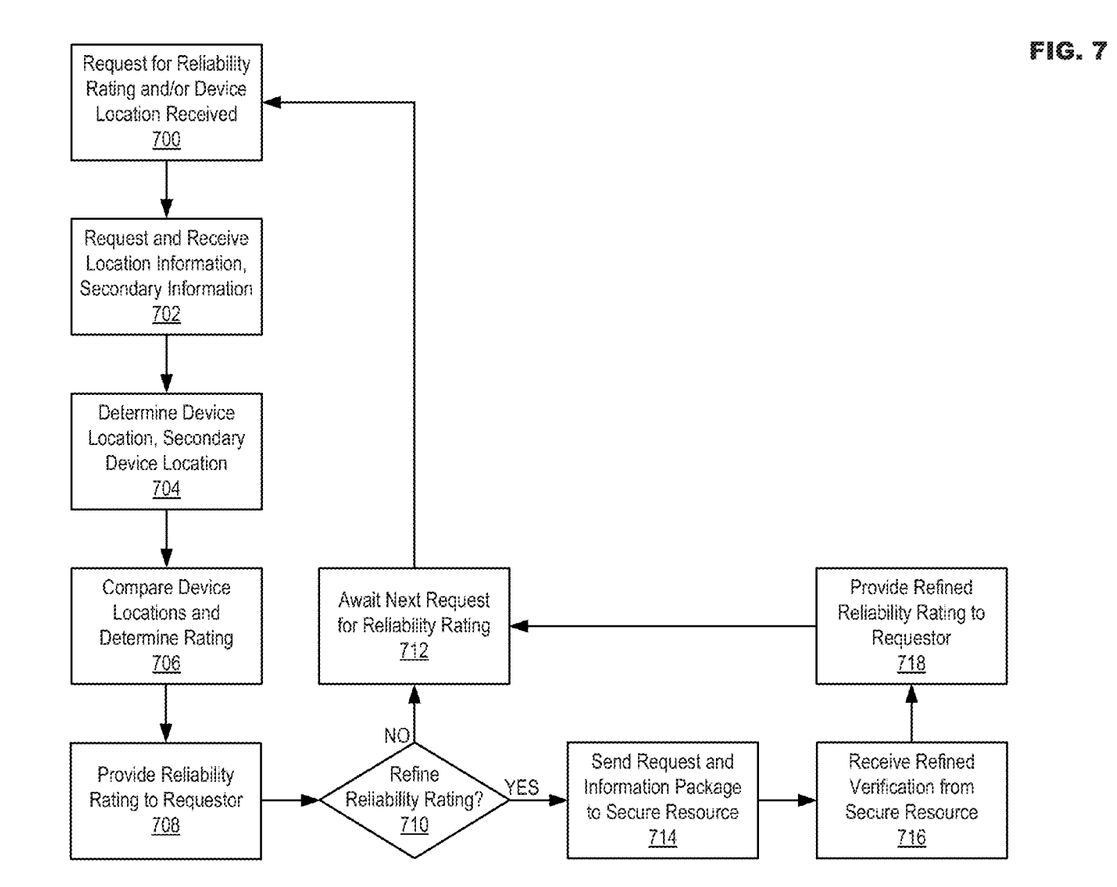
FIG. 7 illustrates a flowchart of example operations for reliability determination from the secure operating core module perspective in accordance with at least one embodiment of the present disclosure.

FIG. 7 illustrates a flowchart of example operations for reliability determination from the SOC module perspective in accordance with at least one embodiment of the present disclosure. In operation 700 a request for at least a reliability rating and/or device location may be received in the SOC module. In operation 702 location information and secondary location information may be requested and then received. Location information may be requested from the location service module in the device, while secondary location information may also be requested from the location services module (e.g., sensor information) as well as other systems in the device (e.g., network-based location information from the communications module, etc.). In operation 704, the location information may be utilized to determine a device location and the secondary device information may be utilized to determine a secondary device location. In operation 706, the two device locations may be compared to determine a reliability rating. The reliability rating may be determined based on, for example, how closely the two device locations correspond.

The reliability rating may be provided to the requestor in operation 708. A determination may then be made in operation 710 as to whether a refined reliability rating is required. In one embodiment a refined reliability rating may be required if, for example, the reliability rating is too low, better assurance of device location is required for an important transaction, etc. If it is determined in operation 710 that a refined reliability rating is not required, then in operation 712 the SOC module may await the next request for a reliability rating (which may be followed by operation 700). If a determination is made in operation 710 that a refined reliability rating is required, then in operation 714 a request and secure information package may be sent to a secure resource (e.g., a secure resource within the device or external to the device as described in FIG. 3). A refined reliability rating may then be received from the secure resource in operation 716 and may be provided to the requestor in operation 718, followed by a return to operation 712.

Figure 8:
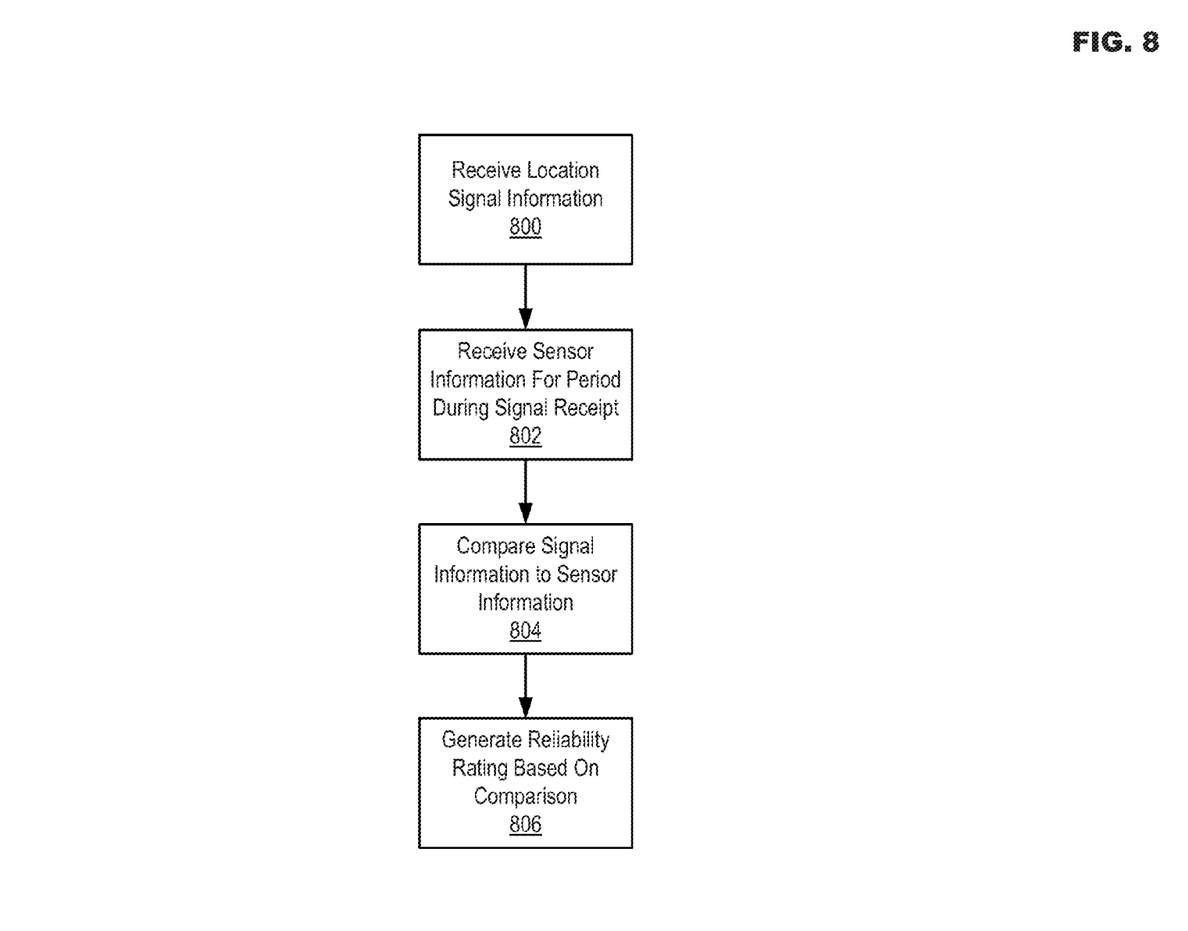
FIG. 8 illustrates a flowchart of example operations for determining a reliability rating for a location signal source based on information sensed by sensors in a device in accordance with at least one embodiment of the present disclosure.

FIG. 8 illustrates a flowchart of example operations for determining a reliability rating for a location signal source based on information sensed by sensors in a device in accordance with at least one embodiment of the present disclosure. The example operations depicted in FIG. 8 may be considered an embodiment of operations 702-706 as illustrated in FIG. 7. In operation 800, location information corresponding to location signals received by the device (e.g., at least one signal received from at least one GPS satellite over a period of time) may be provided to the SOC module. Sensor information (e.g., sensing at least one of device orientation, motion or acceleration over the period of time) may also be received in the SOC module in operation 802, the sensor information being secondary location information to which the location information may be compared in operation 804. For example, in operation 804 signal strength (e.g., SNR) for the at least one received GPS signal over the period of time may be compared to the at least one of device orientation, motion or acceleration sensed over the period of time to determine if changes in the at least one received signal correlate to changes in the sensed information (e.g., based on expected behavior, pattern matching, etc.). In one embodiment, identifying authentic correlations as opposed to fraudulent correlations may be done by, for example, establishing an expected correlation (e.g., based on knowing the location of actual satellites), or ascertaining that multiple satellites are expressing unique correlation patterns that would only be possible if they were being transmitted from different physical locations (e.g., from actual GPS satellites and not a GPS signal replicator configured to simulate a set of fictitious signals). A reliability rating may then be generated based on the comparison in operation. For example, if the device movement described by the location signals correlates closely to the device movement described by the sensor information the reliability rating may be high. Otherwise, the reliability rating may be low, indicating that the location signal source is dubious, the location may be falsified, etc.

While FIGS. 6, 7 and 8 illustrate various operations according to different embodiments, it is to be understood that not all of the operations depicted in FIGS. 6, 7 and 8 are necessary for other embodiments. Indeed, it is fully contemplated herein that in other embodiments of the present disclosure, the operations depicted in FIGS. 6, 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for determining reliability for location resources. A device may be configured to determine device location based on location information received from a location information source, the device including secure systems configured to provide a reliability rating of the location information source. The secure systems may be configured to compare a device location based on the location information to a secondary device location based on secondary information to determine the reliability rating. For example, location information based on location signals received by the device may be compared to sensor information in the device to determine whether the movement described by location information and sensor information agrees. In the same or a different embodiment, a refined reliability rating may be requested from a secure resource in the device or accessible via a network. The secure resource may refine the reliability rating using tertiary information available to the secure resource.

The following examples pertain to further embodiments. In one example embodiment there is provided a system. The system may include a location information source configured to provide location information, and a device configured to receive the location information from the location information source, to determine a device location based on the location information and to determine a reliability rating of the location information source based at least on the location information.

In the above example system being configured to determine the reliability rating may comprise being configured to compare the device location to a secondary device location determined based on secondary location information. In this configuration the example system may be further configured, wherein the location information comprises at least one Global Positioning System (GPS) signal received in the device and the secondary location information comprises sensor information from at least one sensor in the device. In this configuration the example system may be further configured, wherein being configured to determine the reliability rating comprises comparing signal strength for at least one GPS signal received from at least one GPS satellite over a period of time to at least one of device orientation, motion or acceleration sensed over the period of time and determining if changes in the signal strength of the at least one GPS signal correlates to changes in the at least one of sensed orientation, motion or acceleration.

The above example system may be further configured as comprising a secure resource configured to receive a request for a refined reliability rating from the device, to determine the refined reliability rating and to provide the refined reliability rating to the device. In this configuration the example system may be further configured, wherein the secure resource comprises at least a server accessible to the device via a network, the server being configured to determine a refined reliability rating based on tertiary location information available to the server.

In another example embodiment there is provided a device. The device may include a host configured to at least control operation of the device, a communication module configured to transmit and receive information via wired or wireless communication, a location services module configured to receive location information from a location information source and determine a device location based on the location information, and a secure operating core module configured to receive a request for a reliability rating of the location information source, to receive location information from at least the location services module and to determine at least the reliability rating.

The above example device may be further configured, wherein the request for the reliability rating is received from at least one of the host or a remote entity accessible via the communication module.

The above example device may be further configured, wherein the secure operating core module is further configured to determine the device location based on the location information. In this configuration the example device may be further configured, wherein being configured to determine at least the reliability rating comprises being configured to compare the device location to a secondary device location determined based on secondary location information. In this configuration the example device may be further configured, wherein the location information comprises at least one Global Positioning System (GPS) signal and the secondary location information comprises sensor information from a sensor in the location services module. In this configuration the example device may be further configured, wherein being configured to determine at least the reliability rating comprises comparing signal strength for at least one GPS signal received from at least one GPS satellite over a period of time to at least one of device orientation, motion or acceleration sensed over the period of time and determining if changes in the signal strength of the at least one GPS signal correlates to changes in the at least one of sensed orientation, motion or acceleration.

The above example device may be further configured, wherein the secure operating core module is further configured to send a request for a refined reliability rating including a secure information package to a secure resource, and to receive the refined reliability rating from the secure resource. In this configuration the example device may be further configured, wherein the host or a remote entity accessible via the communication module causes the secure operating core module to request the refined reliability rating.

In another example embodiment there is provided a method. The method may include receiving a request for device location, determining whether a reliability rating has also been requested, transmitting the request for device location to a location services module or a secure operating core module based on the determination, and receiving at least one of the device location or the reliability rating.

The above example method may be further configured, wherein the request for device location is transmitted to the location services module and the device location is received from the location services module if it is determined that the reliability rating was not requested.

The above example method may be further configured, wherein the request for device location is transmitted to the secure operating core module, and the device location and reliability rating are received from the secure operating core module, if it is determined that the reliability rating was requested. In this configuration the example method may further comprise determining if a refined reliability rating has been requested, transmitting a request for a refined reliability rating to the secure operating core module if it is determined that the refined reliability rating has been requested, and receiving at least the refined reliability rating from the secure operating core module.

In another example embodiment there is provided a method. The method may include receiving a request to determine a reliability rating, requesting location information via a secure interface, receiving location information via the secure interface, determining at least the reliability rating based on the location information, and providing at least the reliability rating in response to the request.

The above example method may further comprise determining a device location based on the location information, wherein determining at least the reliability rating comprises comparing the device location to a secondary device location based on secondary location information. In this configuration the example method may be further configured, wherein the location information comprises at least one Global Positioning System (GPS) signal and the secondary location information comprises sensor information. In this configuration the above method may be further configured, wherein determining at least the reliability rating comprises comparing signal strength of at least one GPS signal received from at least one GPS satellite over a period of time to at least one of device orientation, motion or acceleration sensed over the period of time and determining if changes in the signal strength of the at least one GPS signal correlates to changes in the at least one of sensed orientation, motion or acceleration.

The above example method may further comprise receiving a request for a refined reliability rating, transmitting a secure information package to a secure resource, and receiving a refined reliability rating from the secure resource.

In another example embodiment there is provided a method. The method may include receiving at least one location signal in a device over a period of time, determining sensor information in the device, the sensor information including at least one of device orientation, motion or acceleration over the period of time, comparing the at least one location signal to the sensor information to determine if changes in the at least one location signal correlate to changes in the at least one of device orientation, motion or acceleration over the period of time, and determining a reliability rating based on the comparison.

The above example method may be further configured, wherein the at least one location signal is a Global Positioning System (GPS) signal.

In another example embodiment there is provided a system comprising at least a location information source and a device, the system being arranged to perform the method of any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided a device comprising at least a host, the device being arranged to perform any of the above example methods corresponding to a device.

In another example embodiment there is provided a device comprising at least a secure operating core, the device being arranged to perform any of the above example methods corresponding to a secure operating core.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
a location information source including a transmitter to transmit at least one global positioning (GPS) signal including location information; and a device including a host including processor circuitry to control operation of the device, a receiver to receive said at least one GPS signal from said location information source, and secure operating core circuitry to:
determine, independently of said host, a device location based on said location information;
determine an expected signal strength for said least one GPS signal at least in part by comparing the signal strength of the at least one GPS signal to at least one of device orientation, device motion or device acceleration sensed over a period of time;

compare said expected signal strength to a signal strength of said at least one GPS signal; and determine, independently of said host, a reliability rating based on said comparison, wherein said reliability rating is indicative of a trustworthiness of said location information source.

2. The system of claim 1, wherein the secure operating core circuitry to determine the reliability rating is to compare the device location to a secondary device location determined based on secondary location information.

3. The system of claim 2, wherein the secondary location information comprises sensor information from at least one sensor in the device.

4. The system of claim 3, wherein the secure operating core circuitry to determine the reliability rating is further configured to determine if changes in the signal strength of the at least one GPS signal over said period of time correlate to changes in the at least one of sensed device orientation, device motion or device acceleration over said period of time.

5. The system of claim 1, further comprising a secure resource to receive a request for a refined reliability rating from the device, to determine the refined reliability rating and to provide the refined reliability rating to the device.

6. The system of claim 5, wherein the secure resource comprises at least a server accessible to the device via a network, the server to determine a refined reliability rating based on tertiary location information available to the server.

7. A device, comprising:
a host including at least one processor circuitry to at least control operation of the device;
communication circuitry to transmit and receive information via wired or wireless communication; location services circuitry to receive location information from allocation information source and determine a device location based on the location information, said location information comprising at least one global positioning (GPS) signal;
and secure operating core circuitry to: receive a request for a reliability rating of the location information source, receive, independently of said host, location information from at least the location services circuitry;
determine an expected signal strength for said GPS signal at least in part by comparing the signal strength of the at least one GPS signal to at least one of device orientation, device motion or device acceleration sensed over a period of time;
compare said expected signal strength to a signal strength of said at least one GPS signal;
and determine, independently of said host, at least the reliability rating based at least on said comparison, wherein said reliability rating is indicative of a trustworthiness of said location information source.

8. The device of claim 7, wherein the request for the reliability rating is received from at least one of the host or a remote entity accessible via the communication module.

9. The device of claim 7, wherein the secure operating core circuitry is to further determine the device location based on the location information.

10. The device of claim 9, wherein the secure operating core circuitry to determine at least the reliability rating comprises comparing the device location to a secondary device location determined based on secondary location information.

11. The device of claim 10, wherein the secondary location information comprises sensor information from a sensor in the location services module.

12. The device of claim 11, wherein the secure operating core circuitry is configured determine if changes in the signal strength of the at least one GPS signal over said period of time correlate to changes in the at least one of sensed device orientation, device motion or device acceleration over said period of time.

13. The device of claim 7, wherein the secure operating core circuitry is to send a request for a refined reliability rating including a secure information package to a secure resource, and to receive the refined reliability rating from the secure resource.

14. The device of claim 13, wherein the host or a remote entity accessible via the communication module causes the secure operating core circuitry to request the refined reliability rating.

15. A method, comprising:
receiving, with location services circuitry of a device, a global positioning (GPS) signal from a location information source, the GPS signal including location information;
determining, with secure operating core circuitry of said device, an expected signal strength for said GPS signal at least in part by comparing the signal strength of the GPS signal to at least one of device orientation, device motion or device acceleration sensed over a period of time;
comparing, with said secure operating core circuitry, said expected signal strength to a signal strength of said GPS signal;
and determining, independently of host processor circuitry of said device and with said secure operating core circuitry, a reliability rating based on said comparison, wherein said reliability rating is indicative of a trustworthiness of the location information source.

16. The method of claim 15 wherein determining at least the reliability rating comprises comparing the device location to a secondary device location based on secondary location information.

17. The method of claim 16, wherein the secondary location information comprises sensor information.

18. The method of claim 17, wherein determining at least the reliability rating comprises comparing, with said secure operating core circuitry, the signal strength of the at least one GPS signal over said period of time to changes in at least one of a sensed device orientation, device motion or device acceleration sensed over the period of time, and determining if changes in the signal strength of the at least one GPS signal over said period of time correlate to changes in at least one of the sensed device orientation, device motion or device acceleration over said period of time.

19. The method of claim 15, further comprising: receiving, with said secure operating core circuitry, a request for a refined reliability rating; transmitting a secure information package to a secure resource; and receiving a refined reliability rating from the secure resource.

20. A system comprising at least one non-transitory machine-readable storage medium having stored thereon, individually or in combination, instructions that when executed by one or more processors of a device result in the following operations comprising:
receiving, with location services circuitry of said device, a global positioning (GPS) signal from a location information source, the GPS signal including location information;

determining, with secure operating core circuitry of said device, an expected signal strength of said GPS signal at least in part by comparing the signal strength of the GPS signal to at least one of device orientation, device motion, or device acceleration sensed over a period of time;

comparing, with said secure operating core circuitry, said expected signal strength to a signal strength of said GPS signal;

and determining, independently of host processor circuitry of said device and with said secure operating core circuitry, a reliability rating of said location information source based at least on said comparison wherein the reliability rating is indicative of the trustworthiness of the location information source.

21. The system of claim 20, wherein determining at least the reliability rating comprises comparing the device location to a secondary device location based on secondary location information.

22. The system of claim 21, the secondary location information comprises sensor information.

23. The system of claim 22, wherein determining at least the reliability rating comprises comparing, with said secure operating core circuitry, the signal strength of the GPS signal over said period of time to at least one of a sensed device orientation, sensed device motion or sensed device acceleration sensed over the period of time, and determining if changes in the signal strength of the GPS signal over said period of time correlate to changes in at least one of the sensed device orientation, sensed device motion or sensed device acceleration over said period of time.

24. The system of claim 20, further comprising instructions that when executed by one or more processors result in the following operations comprising:

Receiving, with said secure operating core circuitry, a request for a refined reliability rating;

transmitting a secure information package to a secure resource; and receiving a refined reliability rating, from the secure resource.

* * * * *